(12) United States Patent
Henry, Jr. et al.

(10) Patent No.: US 8,918,077 B2
(45) Date of Patent: Dec. 23, 2014

(54) METHODS FOR PROVIDING OVERDRAFT PROTECTION FOR POST-PAID COMMUNICATION SERVICE PLANS

(71) Applicant: AT&T Mobility II LLC, Atlanta, GA (US)

(72) Inventors: Coulter C. Henry, Jr., Atlanta, GA (US); Francis Richard Lazaro, Jr., Decatur, GA (US); Andrew Lamont Hines, Jr., Alpharetta, GA (US); Derek Eko-Badu Johnson, Marietta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 13/928,440

(22) Filed: Jun. 27, 2013

(65) Prior Publication Data

US 2013/0287192 A1  Oct. 31, 2013

Related U.S. Application Data

(63) Continuation of application No. 13/308,077, filed on Nov. 30, 2011, now Pat. No. 8,478,235, which is a continuation of application No. 12/650,077, filed on Dec. 30, 2009, now Pat. No. 8,095,111, which is a continuation of application No. 10/886,232, filed on Jul. 7, 2004, now Pat. No. 7,650,138, which is a continuation of application No. 10/754,423, filed on Jan. 9, 2004, now Pat. No. 7,450,928.

(51) Int. Cl.
| | | |
|---|---|---|
| *H04M 11/00* | (2006.01) | |
| *H04M 15/00* | (2006.01) | |
| *H04L 12/14* | (2006.01) | |
| *H04M 17/02* | (2006.01) | |
| *G06Q 30/02* | (2012.01) | |
| *G06Q 50/18* | (2012.01) | |
| *H04M 17/00* | (2006.01) | |

(52) U.S. Cl.
CPC ...... *H04M 17/10* (2013.01); *H04M 2215/0104* (2013.01); *H04M 15/00* (2013.01); *H04M 15/857* (2013.01); *H04M 2215/8158* (2013.01); *H04L 12/1467* (2013.01); *H04M 17/02* (2013.01); *G06Q 30/0239* (2013.01); *H04M 2215/8179* (2013.01); *G06Q 50/188* (2013.01); *H04M 15/851* (2013.01); *H04M 15/44* (2013.01); *H04M 2215/815* (2013.01); *H04M 15/80* (2013.01); *H04M 15/852* (2013.01); *H04M 2215/8166* (2013.01); *H04L 12/1457* (2013.01); *H04M 15/85* (2013.01); *H04L 12/14* (2013.01); *H04M 2215/0152* (2013.01); *H04M 15/854* (2013.01); *H04M 17/00* (2013.01)
USPC .......... 455/408; 455/406; 455/407; 455/409; 455/404.1; 379/114.15; 379/114.2

(58) Field of Classification Search
CPC .. G06Q 30/0239; G06Q 50/188; H04L 12/14; H04L 12/1457; H04L 12/1467; H04M 15/852; H04M 15/854; H04M 15/857; H04M 17/00
USPC .............. 455/408, 406, 407, 409, 404.1, 411; 379/114.15, 114.2
See application file for complete search history.

(56) References Cited

U.S. PATENT DOCUMENTS

| | | |
|---|---|---|
| 5,517,555 A | 5/1996 | Amadon et al. |
| 5,983,091 A | 11/1999 | Rodriguez |

(Continued)

*Primary Examiner* — Khai M Nguyen
(74) *Attorney, Agent, or Firm* — Parks IP Law LLC; Mickki D. Murray, Esq.

(57) ABSTRACT

Methods for adding minutes to a calling plan having a calling plan period. The methods including determining whether a threshold number of minutes have been reached during the calling plan period; and incrementally adding minutes to the calling plan when the threshold number of minutes has been reached. The cost per minute of the added minutes is less than the high-cost per minute rate normally associated with exceeding the threshold number of minutes during the calling plan period.

20 Claims, 4 Drawing Sheets

(56) References Cited

U.S. PATENT DOCUMENTS

| | | |
|---|---|---|
| 6,131,024 A | 10/2000 | Boltz et al. |
| 6,144,847 A | 11/2000 | Altschul et al. |
| 6,393,269 B1 | 5/2002 | Hartmaier et al. |
| 6,487,401 B2 | 11/2002 | Suryanarayana et al. |
| 6,493,547 B1 | 12/2002 | Raith |
| 6,526,273 B1 | 2/2003 | Link, II et al. |
| 6,532,282 B1 | 3/2003 | Plush et al. |
| 6,535,727 B1 | 3/2003 | Abbasi et al. |
| 6,731,729 B2 | 5/2004 | Eng et al. |
| 6,947,723 B1 | 9/2005 | Gurnani et al. |
| 6,990,182 B2 * | 1/2006 | Nelson ............ 379/114.2 |
| 7,450,928 B1 | 11/2008 | Henry et al. |
| 7,650,138 B1 | 1/2010 | Henry et al. |
| 2002/0188469 A1 * | 12/2002 | Shalmi et al. ............ 705/2 |
| 2003/0026404 A1 | 2/2003 | Joyce et al. |
| 2003/0045266 A1 | 3/2003 | Staskal et al. |
| 2003/0220093 A1 | 11/2003 | Fellenstein et al. |
| 2004/0137874 A1 | 7/2004 | Veerepalli et al. |
| 2004/0185827 A1 | 9/2004 | Parks |
| 2004/0266392 A1 | 12/2004 | Jiddou |
| 2005/0136918 A1 * | 6/2005 | Kakatsakis et al. ...... 455/432.3 |

\* cited by examiner

METHODS FOR PROVIDING OVERDRAFT PROTECTION FOR POST-PAID COMMUNICATION SERVICE PLANS

BACKGROUND

1. Field of the Invention

The present invention relates in general to a communication service plan overdraft protection, and in particular, to methods for adding overdraft data blocks to a "post-paying" customer account to avoid incurring high cost overage fees.

2. Description of the Related Art

"Prepaid" wireless has been a major push in the Wireless world to attract customers who have no desire to be bound to a contract, or to those who do not have established credit and/or have poor credit. Prepaid wireless customers may purchase a predetermined number of minutes for use with their wireless telephone as the need arises. There are numerous advantages to entering into prepaid service contract. For example, the carrier is guaranteed that the account will always remain current, and the pre-paying customer is guaranteed that she will not pay overage minutes because by paying beforehand, she can regulate usage and costs of the wireless account.

Today's post-paying customer does not enjoy those same advantages because traditionally, such features have not been available. Under existing post-paying service plan contracts, it is not possible to buy/add additional minutes beyond the allotted predetermined number of minutes prescribed by the service plan. The allotted number of minutes is typically preselected by the post-paying customer at the time the wireless account is activated. Consequently, when a post-paying customer has exhausted all of his or her minutes in the service plan, he or she may not be notified and therefore would automatically be charged additional minutes at what typically is an increased per minute amount. As a result, a post-paying customer may receive a monthly statement in excess of what she anticipated and accounted for in her monthly budget.

Customarily, telephone service plan contracts are established in advance of use in one year increments. Various service plans can be selected by the user when a new user account is established. The user generally selects from among the various plans based on what the user anticipates his or her average minute usage will be for each month. When anticipating average monthly usage, most users do not considers extraordinary usage that may be incurred in any given month, such as, going on vacation or being away from home for extended periods of time.

Various service plans have attempted to solve the problem of causing subscribers to be charged overage minutes, such as allowing a user to accumulate the unused portion of his minutes in any month, and have them rolled over onto the next month billing cycle, or any successive billing cycle thereafter. For example, CINGULAR WIRELESS ROLLOVER® calling plan allows a customer to roll over the unused minutes from one month to the following months billing cycle. Rolling over minutes is only helpful when the subscriber has an excess number of minutes accumulated from previous months. This solution however does not solve the problem faced by the subscriber when there are not accumulated rollover minutes available and she is about to be charged overage minutes once all of her available minutes have been used.

Thus, there is a need to provide methods to regulate overage minutes when a user determines beforehand that she will occasionally go beyond the allotted number of minutes set forth in the service plan contract in any given month.

SUMMARY

The present invention addresses the shortcomings identified above by providing methods for providing a wireless minute overdraft protection plan.

The overdraft protection plan is the mechanism whereby minutes can be incrementally added (or borrowed from another calling period) to a calling plan when the threshold number of minutes has been exhausted so as to prevent the subscriber from incurring increased overage costs for additional minutes beyond those allocated under the subscribers calling plan in a particular calling period. In accordance with this overdraft protection plan, the cost per minute of the added (or borrowed) minutes is less than the cost per minute normally associated with exceeding the threshold number of minutes.

The wireless minute overdraft protection can be implemented either dynamically or manually.

It is an object of the invention to enable a post-paying customer to control the cost of his or here post-paid service plan by being able to add overdraft minutes to their account to prevent overage minutes from being incurred.

In accordance with methods of the present invention, the post-paying customer can add overdraft minutes at any time during, or after, the initial activation of the service plan contract.

One aspect of the invention is to provide a method for adding minutes to a calling plan having a calling plan period. The method includes determining whether a threshold number of minutes have been reached during the calling plan period; and incrementally adding minutes to the calling plan when the threshold number of minutes has been reached. The cost per minute of the added minutes is less than the cost per minute normally associated with exceeding the threshold number of minutes during the calling plan period.

Another aspect of the invention is to provide a method for adding minutes to a calling plan having a threshold number of minutes. The method includes requesting an additional number of minutes; and incrementally adding minutes to the calling plan based on the requesting step, wherein the cost per minute of the added minutes is less than the cost per minute normally associated with exceeding the threshold number of minutes.

Another aspect of the invention is to provide a method for adding minutes to a calling plan. The method includes subscribing to an overdraft protection plan, and determining whether a threshold number of minutes have been used. Thereafter, minutes are incrementally added to the calling plan when the threshold number of minutes has been reached.

The recent trend in the telecommunications industry is for a telecommunication service provider to provide a service in which all of the communication devices (such as a mobile phone, a wireline house phone, cable, a facsimile, an SMS pager, etc.) for a single post-paying customer are pooled together under a single pooled account service plan and billed under a single billing statement. The accounts generally allocate a predetermined number of monthly minutes for use in wireless devices and wireline devices. Accordingly, it is also an object of this invention to provide overdraft minutes to those post-paying customers who have these pooled account service plans. The overdraft minutes can be used for any of the post-paying customer's various communication devices under the pooled account service plan.

These and other objects, features, and/or advantages may accrue from various aspects of embodiments of the present invention, as described in more detail below.

BRIEF DESCRIPTION OF THE DRAWINGS

Various exemplary embodiments of this invention will be described in detail, wherein like reference numerals refer to identical or similar components or steps, with reference to the following figures, wherein.

DETAILED DESCRIPTION OF EXEMPLARY EMBODIMENTS

Figure 1:
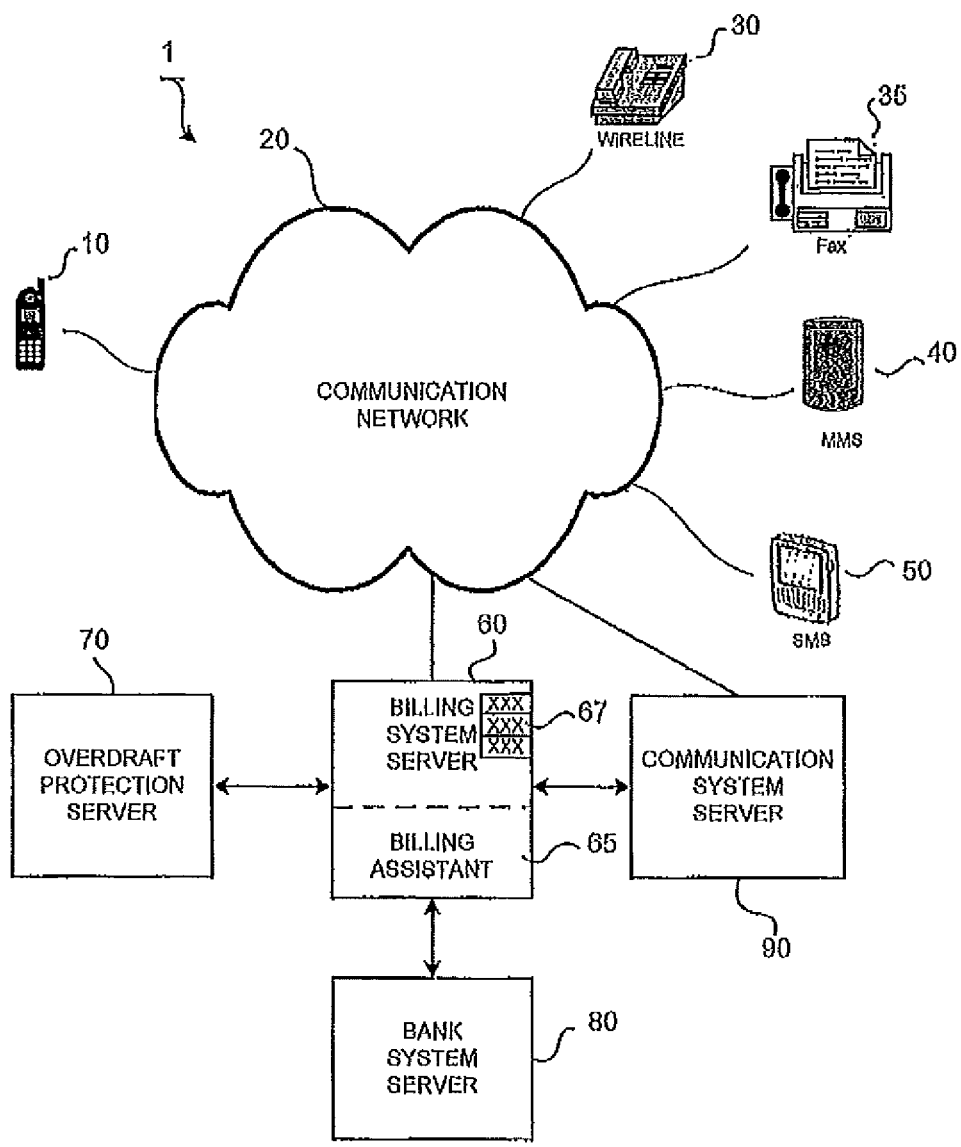
FIG. 1 illustrates an exemplary overdraft protection system for a post-paying customer in accordance with the methods of this invention.

In accordance with the methods of this invention, an overdraft protection plan is provided to post-paying customers for any one of, or all of, their various communication devices. The communication devices can include wireless and wireline devices, such as, wireless mobile phones, wireline phones, SMS paging devices, MMS data transfer devices, facsimile machines, and any other device capable of transferring information using a predetermined monthly minute charge that is now known or later developed in accordance with the methods of this invention.

Particular exemplary embodiments of the present invention will now be described in greater detail with reference to the figures.

There are at least two types of overdraft protection plans that may be implemented. The overdraft protection plan may be implemented either dynamically, or by manual request.

If the overdraft protection plan is implemented dynamically, the number of overdraft minutes may be populated to the post-paying customer's account automatically when an overdraft protection system determines that the post-paying customer has reached the minutes allocated under their base service plan. The post-paying customer may be asked to confirm that she desires to have the overdraft minutes automatically added before they are populated.

However, if the overdraft protection plan is implemented as a non-dynamic system, overdraft minutes are populated to the post-paying customers account if the post-paying customer actively seeks out and requests the additional overdraft minutes. In this manner, the additional overdraft minutes are manually requested and purchased at the discretion of the post-paying customer, and are based on her immediate desire to add new overdraft minutes. The following is a description of the dynamic and non-dynamic implementation of the overdraft protection system.

I. Dynamic Population of Overdraft Minutes

In accordance with methods of this invention, a post-paying customer account may dynamically add overdraft minutes to prevent incurring high cost overage minutes which may run as high as $0.50 or more per minute. Instead of paying overage rates, post-paying customers may protect themselves by agreeing to pay a lower rate ahead of time by enrolling in an overdraft protection plan. The enrollment into an overdraft protection plan may or may not have a fee associated therewith. Enrollment may be accomplished by the post-paying customer establishing an overdraft protection plan with her carrier. In an exemplary agreement, the post-paying customer agrees to pay a predetermined price for any number of overage or additional minutes needed, instead of paying the higher cost overage rates per minute under the base service plan. Accordingly, the post-paying customer is allowed to flexibly control the cost of her account.

The population of additional overdraft minutes to the post-paying customer's base service plan account occurs dynamically under this overdraft protection plan. Alternatively, the post-paying customer may be prompted to verify that she would like the minutes to be automatically populated to her account. In some instances, it may be more economically suitable to pay overage minutes that to populate the overdraft minutes to her account. For example, if there is only one day left in the billing cycle before a new allotment or available minutes are populated to the post-paying customer's account, the post-paying customer may opt to pay the overage minutes instead of adding a predetermined number of overdraft minutes because she may not be able to substantially use the overdraft minutes before the end of the billing cycle, i.e., one day. Charges to the post-paying customer may be made at the time. For example, changes may be billed when the overdraft minutes are added, or may be billed to the customer's monthly statement.

In particular, a post-paying customer may establish an overdraft protection plan upon contracting her base service plan for her communication device. Alternatively, a post paying customer may enroll in the overdraft protection plan after he has contracted his base service plane.

Upon enrollment in to the overdraft protection plan, the post-paying customer may select a preference as to the number of overdraft minutes that she wishes to have automatically added to her account after she has used the predetermined number of minutes allotted under her base service plan.

FIG. 1 illustrates an exemplary overdraft protection system 1 in accordance with methods of this invention. The hardware and software connections shown in FIG. 1 are arranged for the population of additional overdraft minutes in accordance with both the exemplary dynamic and non-dynamic overdraft protection plans of this invention.

In FIG. 1, a communication network 20 is shown connected to various wireless and wireline communication devices. The communication network 20 may be any type of communication network that is capable of transmitting information, such as voice, data, short messaging (SMS), multimedia messaging (MMS), facsimiles, and any other type of information that may be transmitted in accordance with methods of this invention including a PSTN, a GSM network, TDMA, UMTS, GPRS, and any other known or later developed network.

The various communication devices may include a mobile station 10, a telephone terminal 30, a facsimile 35, a multimedia messaging device (MMS) 40 and a short messaging device (SMS) 50, and/or any other type of commercially available communication device capable of communicating through the communication network 20.

The various communication services provided by each of the communication devices 10, 30, 35, 40, 50 may be implemented as separate components or integrated as a single component. For example, a single communication device may be implemented that incorporates mobile telephone services, multimedia messaging services, short messaging services and facsimile services. In addition, communication devices 10, 30, 35, 40, 50 may be pooled together under a single communication service provider to provide a service in which all of the communication devices (such as a mobile phone, a wireline house phone, a facsimile, an SMS pager, etc.) for a single post-paying customer are pooled together under a single pooled account service plan and billed in a single statement.

The communication network 20 communicates with a billing system server 60. In FIG. 1, the billing system server 60 communicates with an overdraft protection server 70. The overdraft protection system 1 may also include a communication system server 90 and a bank system server 80 that communicates with, for example, the billing system server 60. The billing system server 60 may be implemented separate from the overdraft protection system server 70 and the communication system server 90, or it may be integrated as a single component incorporating those system servers. Any number of arrangements is possible in accordance with methods of this invention.

The mobile station 10 may be any type of mobile device, such as a mobile phone which communicates via the communications network 20. The telephone terminal 30 may be any type of telephone connected to the communication network 20, such as a public switched telephone network, the Internet, or via any other communication network, such as a mobile phone network, a private telephone network, a packet-switched network, etc. The MMS 40 and the SMS 50 may also be any type of messaging device that communicates with the communication network 20.

The communication system server 90 may be any type of communication network capable of transmitting information, for example, voice, data, SMS, MMS, and/or any other type of information that may be transmitted in accordance with the methods of this invention.

The billing system server 60 is a billing server that monitors, handles and processes changes to a post-paying customer's billing information. The post-paying customer's billing information may include, the type of plan subscribed to by the post-paying customer, and/or any other type of billing information. The billing system server 60 coordinates with the overdraft protection system server 70, the communication system server 90 and the bank system server 80 to process and to provide overdraft protection minutes to a post-paying customer. The billing system server 60 may incorporate a billing assistant 65. The billing system server 60 is an account server that contains all of the data for identifying the post-paying customer and data identifying the client and his subscription device. The billing system server 60 may also include communication call consumption counters 67. The counters 67 are respectively associated with the various communication devices 10, 30, 35, 40, 50. Each of the counters 67 keep track of the post-paying customer's available minutes by decrementing and incrementing in accordance with the base service plan subscribed to by the post-paying customer and/or other actions applied to the base service plan.

The billing assistant 65 may be implemented as an interface with which the post-paying customer communicates to request the overdraft protection minutes. The billing assistant may be implemented as a person, as hardware or software, and/or any other medium that is capable of processing the request to add additional overdraft minutes for the post-paying customer.

Information regarding the post-paying customer's base service plan account may be interactively transmitted to the post-paying customer by the billing system server 60 through the billing assistant 65. The billing system server 60 may instruct the communication server system 90 to send return messages (such as for example, "You have 10 minutes remaining under your current plan, do you want to add 100 overdraft minutes to your account?") to the post-paying customer in order to assist the post-paying customer in obtaining overdraft protection minutes. The return message may be translated into various formats associated with the various communication devices 10, 30, 35, 40, 50, such as voice, data, SMS, MMS, etc, and/or any other type of format now known or later developed.

The overdraft protection server 70 may include a list of account numbers and/or other identifiers which identify a post-paying customer and the communication devices 10, 30, 35, 40, 50 that are included as part of the overdraft protection plan.

The bank system server 80 is a bank with which the carrier managing various customers, and their communication devices 10, 30, 35, 40, 50, has entered into transaction agreements on behalf of its customers. For example, the bank system server 80 may be the post-paying customer's personal banking account system server from which his or her bill is paid.

At the time of activation, a particular post-paying base service plan is selected by the post-paying customer. In addition, the post-paying customer may also choose to enroll in the overdraft protection plan at any time after activation. The overdraft protection plan may be set up to cover any one of, or all of, the communication devices 10, 30, 35, 40, 50. When the post-paying customer enrolls in the overdraft protection plan, the post-paying customer's information is recorded by the billing system server 60. The post-paying customer's information is also logged and stored with the overdraft protection system server 70 as being an eligible subscriber for that overdraft protection service. The post-paying customer's information may include, for example, the communication devices 10, 30, 35, 40, 50 associated with the post-paying customer, the base service plan, increments of the number of overdraft minutes to be added, the maximum number of overdraft minutes and/or any other information in accordance with methods of this invention.

Payment for the purchase of the overdraft protection minutes may be made in accordance with the subscriber's current billing preference or by electronic funds transfer between the billing system server 60 and the bank system server 80. The post-paying customer could supply her bank information to the bank system server 80 beforehand so that the post-paying customer may be billed immediately, or at a later time. The post-paying customer data may be stored with the billing system server 60.

The overdraft protection fee may be assessed at various times. For example, the overdraft protection fee may be billed to the post-paying customers account immediately, or billed at a later date with their monthly statement. Alternatively, a separate bill may be generated at the time that the overdraft minutes are applied to the post-paying customers base service plan account. Any number of possible billing variations is possible in accordance with methods of this invention.

According to methods of this invention, when the post-paying customer reaches a predetermined number of minutes (e.g., 470 minutes), or a predetermined threshold number of minutes are remaining (such as 30 minutes) under his agreement, a predetermined number of minutes (such as 50 or 100) may be populated to the post-paying customer's account for use to prevent the post-paying customer from paying the excessive overage rates for those minutes used above his allotted 500 under his agreement. The predetermined number of overdraft minutes to be added, and/or the predetermined threshold number of minutes, may be predefined by the post-paying customer when she enrolls in the overdraft protection plan. Alternatively, these values may also be set up in advance by the service provider.

Once the predetermined threshold number of minutes has been reached, the overdraft protection plan may automatically populate the post-paying customer's remaining minutes with the predetermined number of overdraft minutes according to the overdraft protection plan subscribed to by the post-paying customer. As a result, the post-paying customer will not be charged excessive overage rates.

A fee established under the overdraft protection plan may be charged for providing the overdraft protection service.

Figure 2:
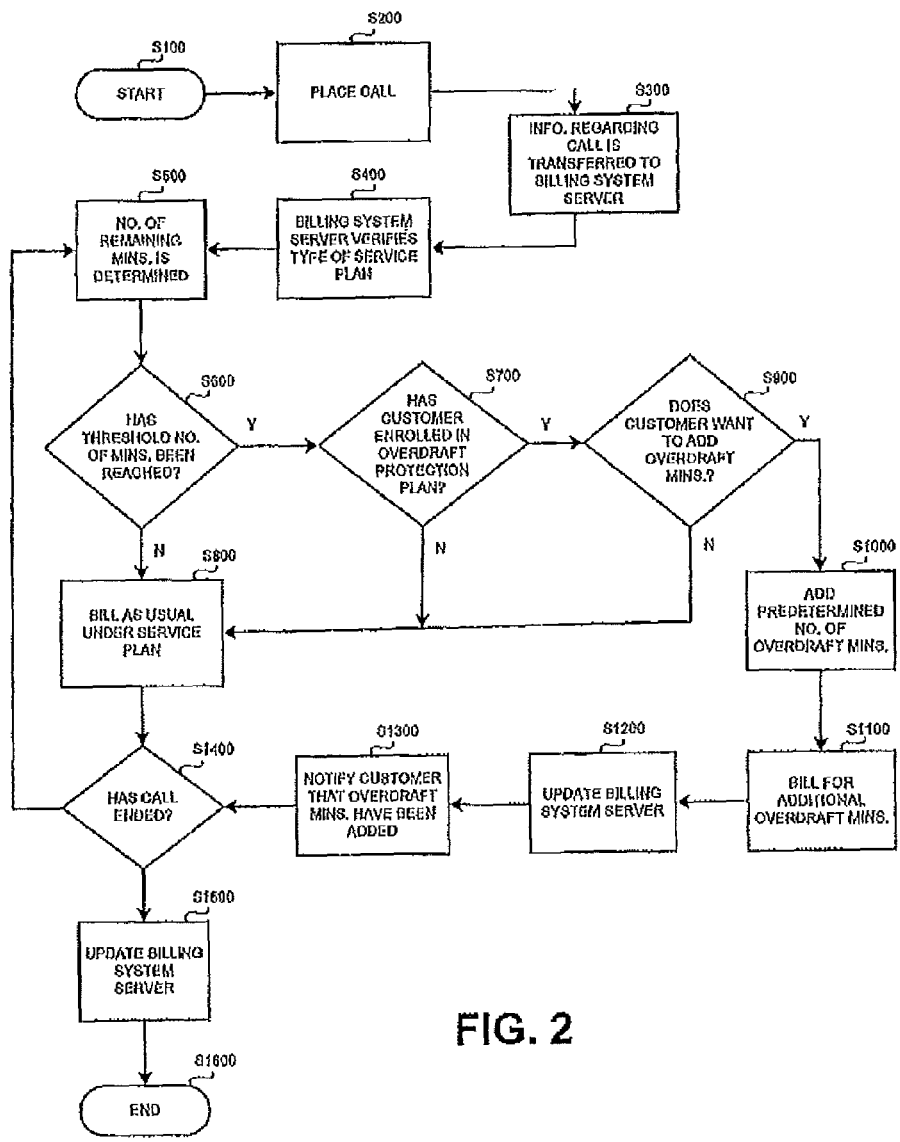
FIG. 2 illustrates an exemplary dynamic method for providing an overdraft protection system for a post-paying customer in accordance with the methods of this invention.

FIG. 2 illustrates an exemplary method for providing a dynamic overdraft protection system for post-paying customers in accordance with methods of this invention.

In step S100, a control routine begins. The routine continues to step S200.

In step S200, a call is placed by a post-paying customer to an intended recipient. Alternatively, the dynamic overdraft protection system may continually monitor the number of minutes available under the post-paying customer's service plan. When the number of minutes remaining falls below a predetermined threshold limit, the overdraft protection system may perform the routine process as set forth below. The routine proceeds to step S300.

In step S300, information about the call is transferred to a billing system server. The routine continues to step S400.

In step S400, the billing system server determines and verifies the type of base service plan subscribed to by the post-paying customer. Data information such as the number of minutes used and number of minutes remaining in the post-paying customer's service plan are stored and shared for use by the billing system server. The routine proceeds to step S500.

In step S500, the number of remaining minutes that the post-paying customer has available according to their base service plan is determined, communicated to and processed by the billing system server. These processes may take place in real time. The routine proceeds to step S600.

In step S600, the control routine determines whether the post-paying customer has reached a predetermined threshold number of minutes left in the post-paying customer's base service plan. The predetermined threshold number of minutes may be, for example, a minimal number of anytime minutes remaining in a base service plan agreement. If it is determined that the threshold number of minutes provided by the post-paying customer's base service plan has not been reached, then the control routine continues to step S800 and billing as usual takes place in accordance with the predetermined base service plane. Otherwise the routine proceeds to step S700.

In step S700, the routine verifies whether the post-paying customer has enrolled in the overdraft protection plan. If the post-paying customer has not enrolled in the overdraft protection plan, the routine proceeds to step S800. Otherwise, the routine proceeds to step S900.

In step S800, the post-paying customer is billed as usual under the base service agreement. That is, once the post-paying customer has exhausted her remaining available number of minutes under the base service plan agreement, the post-paying customer is billed at the higher cost overage rate set forth under the predetermined base service plan, which could be as high as $0.50 per minute or more.

To the contrary, if in step S700 it is determined that the post-paying customer has enrolled in the overdraft protection plan, the routine proceeds to step S900.

In step S900, the post-paid customer is queried by the control routine as to whether she wants to add the overdraft minutes. The query may be sent to the post-paying customer's communication device as a notification that her remaining available number of minutes is about to be exhausted. The query may be sent to the post-paying customer's communication device in a variety of different modes, for example, by SMS, MMS, and or any other mode for transferring a notification to the post-paying customer. The post-paying customer may then be asked to elect to have overdraft minutes added.

If the post-paying customer is currently on a call, the overdraft protection system may place the query to the post-paying customer during the current call when the post-paying customer has reached the predetermined threshold number of minutes such that the post-paying customer may be informed, and may make a decision as to whether or not she would like to add additional overdraft minutes. The interaction between the overdraft protection system and the post-paying customer may be implemented to take place seamlessly without the current caller being interrupted. The notification may take place in the form of a tone, an SMS, and MMS, or any other mode for alerting the user of the query. Various modes for replying to the inquiry may be performed by the post-paying customer. For example, the post-paying customer may reply by pushing a button on the keypad, replying by SMS, MMS and/or any other mode for replying.

Confirmation by the post-paid customer to add the overdraft minutes may vary depending on various situations. For example, if the post-paid customer only has a day or two before the end of his current billing period (for example, a couple of days before the end of the month), i.e., a couple of days before the beginning of the new billing period in which a new set of minutes will be populated under the post-paid customer's base service plan, it may be more favorable for the post-paid customer to decline to have the overdraft protection system automatically add additional overdraft minutes. Instead, the post-paying customer may choose to pay the high cost overage rates for the remaining couple of days instead of paying for a large allotment of new minutes under the overdraft protection plan. Paying the high cost overage rates for the remaining couple of days at the end of a billing period may be less expensive for the post-paying customer, as opposed to paying for the large allotment of new minutes (for example 100 minutes) under the overdraft protection plan.

In the alternative, if the additional overdraft minutes are purchased and not used during the current billing cycle in which they were purchased, the minutes may be cancelled, refunded, added over onto the next month billing cycle, or attributed to the client's base service plan in any other manner in accordance with economical billing practices. For example, CINGULAR WIRELESS ROLLOVER® calling plan allows a customer to add the unused minutes from one month to the following month's billing cycle.

If in step S900, the post-paid customer declines adding the additional overdraft minutes, control routine jumps to step S800 and the post-paying customer is billed as usual under the base service agreement. Otherwise, if the post-paid customer elects to add the additional overdraft minutes, the control routine continues to step S1000.

In step S1000, the predetermined number of overdraft minutes are added, or populated, to the post-paying customer's predetermined base service plan. The predetermined number of overdraft minutes may be added in any allotment, such as for example, 50, 75, 100, 200, 500, 1000 or any other number of minutes. The overdraft minutes may be applied to one or all of the communication devices, such as under a pooled service contract agreement. For example, as mentioned above, the overdraft minutes may be added to a pooled service plan in which all of the communication devices share a bucket of minutes. The control routine then proceeds to step S1100.

In step S1100, the post-paying customer is charged an overdraft protection fee and the fee is billed to the post-paying customer's service plan account. The overdraft protection fee may be assessed at various times. For example, the overdraft protection fee may be applied to the post-paying customer's account and billed on their monthly statement. Alternatively, a separate bill may be generated at the time the overdraft minutes are applied to the post-paying customer's service plan account. The control routine then proceeds to step S1200.

In step S1200 the billing system server is updated. The routine then continues to step S1300.

In step S1300, the billing system server instructs a communication system server to notify the post-paying customer that the agreed allotment of overdraft minutes has been added to the remaining available minutes under the post-paying customer's base service plan. The communication system server may inform the post-paying customer in a variety of different ways. For example, notice may be given to the post-paying customer by voice message, data, SMS messaging MMS messaging, facsimile, or any other method available in accordance with the system and methods of this invention. The routine then proceeds to step S1400.

In step S1400 the routine determines whether the call has ended. If it is determined that the call has ended, the routine proceeds to step S1500. Otherwise, the routine returns to step S500.

In step S500, the routine again monitors the number of minutes that the post-paying customer has available in his base service plan and communicates that information to and from the billing system server. The routine proceeds forward through step S600 to step S1400 as discussed above.

In step S1500, the billing system server is updated. For example, the number of minutes that were used to date, the number of minutes that are left (including the overdraft minutes added) under the post-paying customer's base service plan, etc., are communicated to the billing system database and updated therein for future queries according to this invention. Although shown at steps S1200 and S1500, the billing system server may be updated continuously or at any time during the process. The routine then proceeds to step S1600 and the routine ends.

Figure 3:
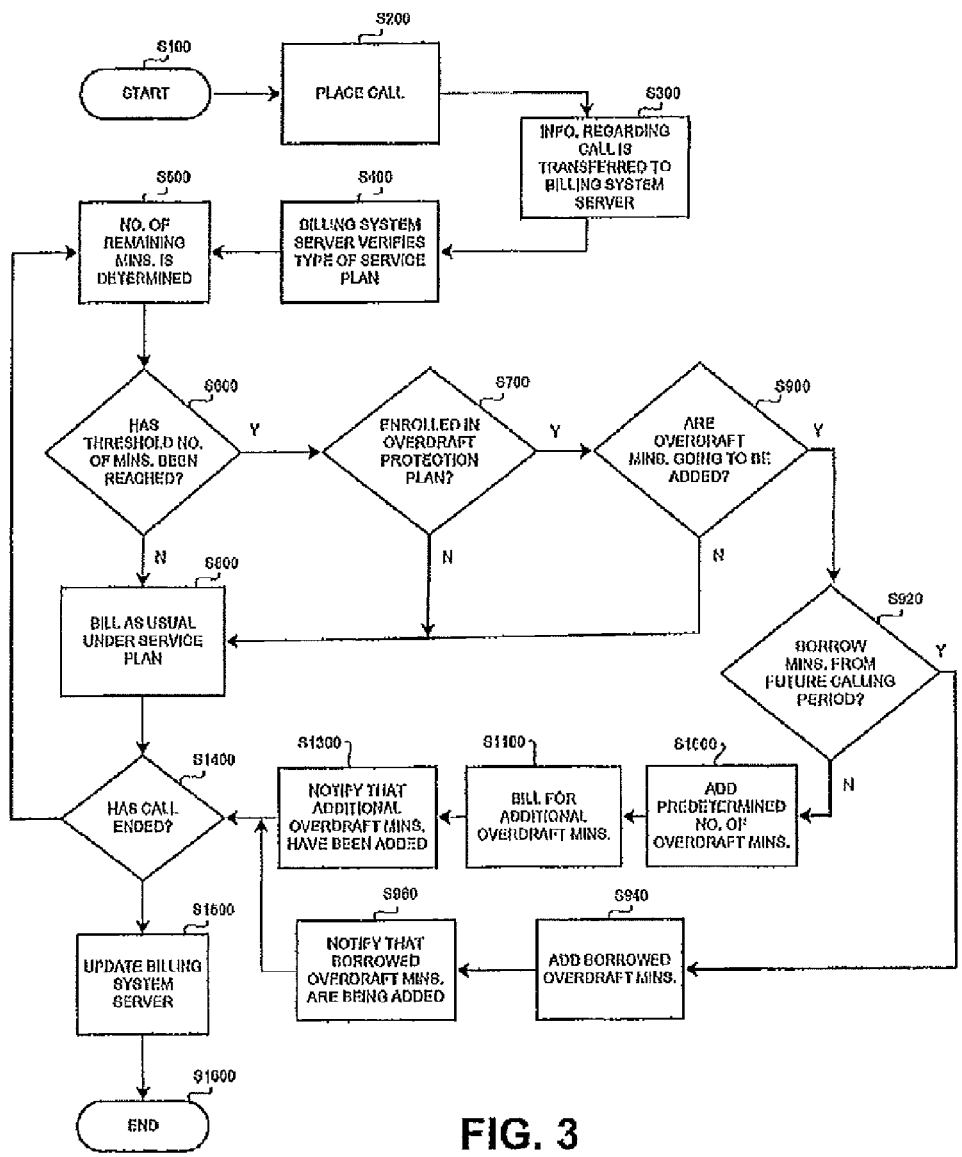
FIG. 3 illustrates another exemplary method for providing a dynamic overdraft protection system for a post-paying customer wherein the additional overdraft protection minutes are deducted from a second set of minutes associated with a second calling plan period.

FIG. 3 illustrates another exemplary method for providing a dynamic overdraft protection system for a post-paying customer where additional overdraft protection minutes are borrowed and deducted from a second set of minutes associated with a second calling plan period.

For example, FIG. 3 includes steps similar to those shown in FIG. 2 with the addition of steps S920, S940 and S960.

In step S920, the customer is asked to indicate whether she would like to borrow additional minutes from a second set of minutes associated with a second calling plan period instead of having to purchase additional overdraft minutes. If the response is no, then the control routine continues to step S1000 as described above with respect to FIG. 2. However, if the response is yes, then the routine proceeds to step S940.

In step S940, borrowed overdraft minutes from a future calling period are added and deducted from the future calling plan. The borrowed overdraft minutes can be added in a variety of different modes, for example, incrementally or dynamically. An incremental allotment of minutes can be added and accounted for as described above with respect to FIG. 2. If the borrowed overdraft minutes are added dynamically, the billing system server can be implemented to keep track of the customer's minutes used and added in real time, or close thereto. The routine then proceeds to step S960.

In step S960, the billing system server instructs the communication system server to notify the post-paying customer that an allotment of borrowed overdraft minutes has been, or is currently being added. As mentioned before, the communication system server may inform the post-paying customer in a variety of different ways. The routine then proceeds to step S1400 and continues as mentioned above.

Borrowing minutes from a future calling period can also be implemented in accordance with specific manual requests to purchase additional minutes as mentioned below under section II.

II. Manual Request for Population of Overdraft Minutes

In an alternative embodiment, the methods according to this invention may provide a non-dynamic "prepaid" option for the post-paid customer. The overdraft protection plan allows subscribing post-paying customers to specifically request and purchase additional overdraft minutes during times in which the post-paying customer may foresee an increase in call frequency, for example, contemporaneous with major holidays in which post-paying customers may use more minutes than normal, for example, due to calling family and friends.

When the need arises, a post-paying customer has the option to purchase additional overdraft minutes in any number of various bundles, such as 50, 100, 200, 300, 400, 500 and 1000 minutes, to add to their existing available minutes under their base service plan. This allows the post-paying customer to protect themselves from over usage.

In operation, a user may make a request to purchase the additional overdraft minutes, before or during a billing cycle, and add the overdraft minutes to their existing available minutes. A minimal "processing fee" may be charged. Once the purchase transaction is processed, the overdraft minutes are added to the existing available minutes. If the additional minutes are not used during the billing cycle in which they were purchased, the minutes may be cancelled, refunded, or carried over onto the next month billing cycle, or attributed to the client's base service plan in any other manner in accordance with economical billing practices.

Various options for purchasing the additional overdraft minutes in accordance with this invention may be available.

For example, a series of boxes may be placed on a billing statement. Each of the boxes may be associated with instructions, such as, to purchase additional overdraft minutes, e.g., 100, 200 or 500 overdraft minutes. Another box may indicate the month or billing cycle in which the post-paying customer desires to have the additional overdraft minutes provided to the post-paying customer's base service plan.

A post-paying customer may also call customer service and/or the billing assistant 65, as shown in FIG. 1, and request to purchase additional overdraft minutes. The post-paying customer may have the option to pay for the additional overdraft minutes immediately, for example by credit card, or receive the additional charge attributed to her next bill.

Alternatively, the post-paying customer may log onto a website and purchase additional overdraft minutes. The website may be owned by the subscriber's own carrier, or some other third-party owned website. The third-party owned website could be for example, EBAY®, AMAZON®, or any other website capable of providing the additional overdraft minutes for sale. The additional overdraft minutes may also be represented and/or obtained for example, by coupons, vouchers, or other types of written instruments. Any mode now known or later developed may be used for purchasing additional overdraft minutes, such as a post-paying customer sending an SMS, an MMS request for more minutes, logging into a WAP server and/or placing a request for additional minutes from any phone.

Numerous advantages are provided by the overdraft protection plan according to this invention. For example, the overdraft protection plan may help to reduce delinquent bills because of the foreseeable protection. Likewise, the "traditional" post-paid customer could realize-added security by protecting themselves against inflated billing.

In accordance with the methods of this invention, this approach may also be applied to various types of services, such as GSM, SMS, MMS and GPRS data packages, for example, in which heavy business users may purchase additional GPRS data bytes and add the minutes to the number of data bytes sold in the future GPRS plans.

Figure 4:
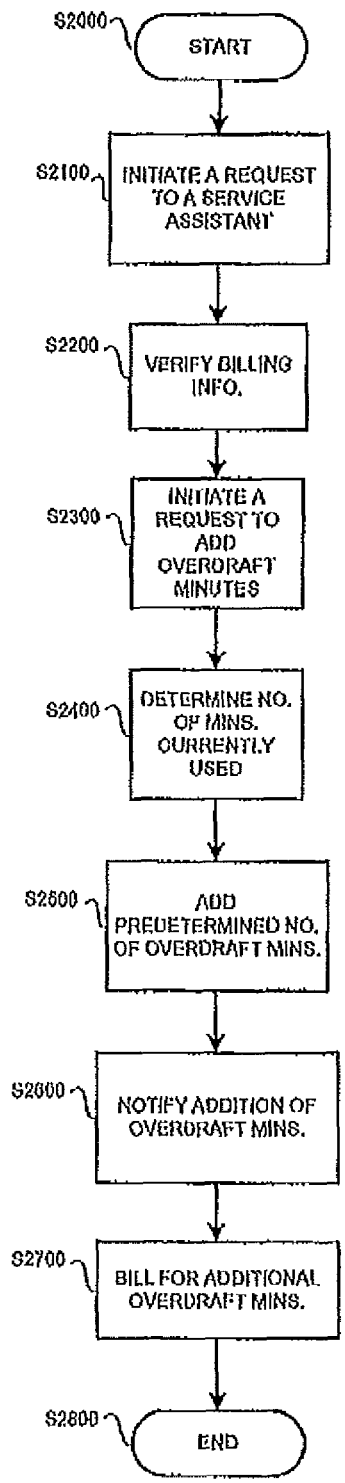
FIG. 4 illustrates an exemplary manual method for providing an overdraft protection system for a post-paying customer in accordance with the methods of this invention.

FIG. 4 illustrates an exemplary method for providing a non-dynamic overdraft protection system to post-paying customers in accordance with the methods of this invention.

In step S2000, a control routine begins. The routine continues to step S2100.

In step S2100, a request for additional overdraft minutes is initiated by a post-paying customer to a customer service assistant. The request may be made in the form of a telephone call to a customer service number of the service provider and/or via paper bill or a website. The request may also be made over the Internet, by an SMS message, or by any other commercially available manner for placing a request now known or later developed. As mentioned before, the customer service assistant may be a person, or may be implemented as hardware or software capable of processing the request. The routine proceeds to step S2200.

In step, S2200, the customer service assistant verifies the post-paying customers billing information via a billing system server. The customer service assistant may be implemented as part of, or separate from, the billing system server that processes the request to add overdraft minutes. Verification of billing information may include determining the type of program that the post-paying customer has enrolled in and verifying whether the post-paying customer has enrolled and is eligible for the overdraft protection plan. According to this exemplary method, the post-paying customer does not necessarily have to enroll in the overdraft protection plan. The customer service assistant may also verify that the customer is a post-paying customer as opposed to a prepaid customer. The number of minutes used and/or available for use under the post-paying customer's current service plan is also determined. The routine proceeds to step S2300.

In step S2300, the billing system server initiates a request to add overdraft minutes from an overdraft protection system server. Based on the post-paying customer's request and the base service plan entered into by the post-paying customer, the overdraft protection system server will allocate a predetermined number of overdraft minutes to be populated to the post-paying customer's base service plan. The routine proceeds to step S2400.

In step S2400, the number of minutes used is determined, for example, based on current data collected and information updated by a net counter. The current number of minutes available is captured and conveyed to the billing system server. The routine then proceeds to step S2500.

In step S2500, the billing system server processes the request and adds the predetermined number of overdraft minutes to the number of minutes available under the post-paying customer's base service plan. The routine proceeds to step S2600.

In step S2600, the billing system server instructs a communication system server to notify the post-paying customer that the agreed allotment of overdraft minutes has been added to the remaining available minutes under the post-paying customer's base service plan. The communication system server may inform the post-paying customer in a variety of different ways. For example, notice may be given to the post-paying customer by voice message, data, SMS messaging, MMS messaging, facsimile, or any other method available in accordance with the system and methods of this invention. The routine proceeds to step S2700.

In step S2700, the post-paying customer is billed an overdraft protection fee for the overdraft minutes added. The overdraft protection plan fee may be assessed at various times. According to this non-dynamic overdraft protection system, the post-paying customer may be billed before the overdraft minutes are added. As mentioned before, the overdraft protection plan fee may be applied to the post-paying customers account and billed on their monthly statement. Alternatively, a separate bill may be generated at the time that the overdraft minutes are applied to the post-paying customers service plan account. The routine proceeds to step S2800 and the routine ends.

One of ordinary skill in the art would understand that the steps described above in FIGS. 2 and 3 are not necessarily limited to any one particular order and may be implemented in any order that may achieve the objects and features described above in accordance with the methods of this invention. Moreover, the time unit of minutes used to describe the exemplary embodiments may be any unit of measurement associated with the subscriber's calling plan, including but not limited to hours, seconds, or per call charges, and the term "minutes" as used herein is intended to encompass all such alternatives. Likewise, the term "months" has been used to describe a billing cycle, but the invention may be applied to any calling plan time period.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

The invention claimed is:

1. A method, for providing overdraft protection in connection with a communications account, comprising:
 receiving, by a server having a processor, a user instruction to add data blocks to a present data plan period of the communications account by a mechanism selected from a group consisting of:
  borrowing additional data blocks from a future data plan period; and
  charging a first predetermined cost per additional data block for additional data blocks;
 adjusting, by the server, in response to receiving the user instruction, the communications account to add additional data blocks to the communications account, including adjusting the communications account to add the additional data blocks in predetermined first size increments; and
 charging, if the user instruction indicates that the user would like to be charged the first predetermined cost per additional data block for additional data blocks, a user fee corresponding to the first predetermined cost per additional data block.

2. The method of claim 1, wherein the first predetermined cost per additional data block is less than a cost per data block normally associated with exceeding a predetermined base number of data blocks during a data plan period for the communications account.

3. The method of claim 2, further comprising adjusting, by the server, the communications account to provide additional data blocks in predetermined second size increments for a second predetermined cost per data block.

4. The method of claim 1, further comprising adjusting, by the server, the communications account to provide additional data blocks in predetermined second size increments for a second predetermined cost per data block in response to usage of the communications account increasing above a threshold number of data blocks over a predetermined base number of data blocks.

5. The method of claim 1, wherein data blocks of the communications account, adjusted by the server, are shared among multiple communication devices.

6. The method of claim 1, wherein the communications account is a post-paid account including a plurality of data plan periods, each data plan period having a predetermined base number of data blocks.

7. The method of claim 1, further comprising:
determining, by the server, whether the communications account is associated with an overdraft protection; and
providing, in response to determining that the communications account is associated with overdraft protection, a user-inquiry message to determine whether the user would like to borrow additional data blocks from the future data plan period or be charged the first predetermined cost per additional data block for additional data blocks.

8. A computer-readable storage device comprising computer-executable instructions that, when executed by a processor, cause the processor to perform operations comprising:
receiving a user instruction to add data blocks to a present data plan period of the communications account by a mechanism selected from a group consisting of:
borrowing additional data blocks from a future data plan period; and
charging a first predetermined cost per additional data block for additional data blocks;
adjusting, in response to receiving the user instruction, the communications account to add additional data blocks to the communications account, including adjusting the communications account to add the additional data blocks in predetermined first size increments; and
charging, if the user instruction indicates that the user would like to be charged the first predetermined cost per additional data block for additional data blocks, a user fee corresponding to the first predetermined cost per additional data block.

9. The computer-readable storage device of claim 8, wherein the first predetermined cost per additional data block is less than a cost per data block normally associated with exceeding a predetermined base number of data blocks during a data plan period for the communications account.

10. The computer-readable storage device of claim 9, wherein the operations further comprise adjusting, by the server, the communications account to provide additional data blocks in predetermined second size increments for a second predetermined cost per data block.

11. The computer-readable storage device of claim 8, wherein the operations further comprise adjusting, by the server, the communications account to provide additional data blocks in predetermined second size increments for a second predetermined cost per data block in response to usage of the communications account increasing above a threshold number of data blocks over a predetermined base number of data blocks.

12. The computer-readable storage device of claim 8, wherein data blocks of the communications account are shared among multiple communication devices.

13. The computer-readable storage device of claim 8, wherein the communications account is a post-paid account including a plurality of data plan periods, each data plan period having a predetermined base number of data blocks.

14. The computer-readable storage device of claim 8, wherein the operations further comprise:
determining whether the communications account is associated with overdraft protection; and
providing, in response to determining that the communications account is associated with overdraft protection, a user-inquiry message to determine whether the user would like to borrow additional data blocks from the future data plan period or be charged the first predetermined cost per additional data block for additional data blocks.

15. A server, for providing overdraft protection in connection with a communications account, comprising:
a processor; and
a computer-readable memory being in operative communication with the processor and comprising computer-executable instructions that, when executed by the processor, cause the processor to perform operations comprising:
receiving a user instruction to add data blocks to a present data plan period of the communications account by a mechanism selected from a group consisting of:
borrowing additional data blocks from a future data plan period; and
charging a first predetermined cost per additional data block for additional data blocks, the first predetermined cost per additional data block being less than a cost per data block normally associated with exceeding a predetermined base number of data blocks during a data plan period for the communications account;
adjusting, in response to receiving the user instruction, the communications account to add additional data blocks to the communications account, including adjusting the communications account to add the additional data blocks in predetermined first size increments;
charging, if the user instruction indicates that the user would like to be charged the first predetermined cost per additional data block for additional data blocks, a user fee corresponding to the first predetermined cost per additional data block; and
adjusting the communications account to provide additional data blocks in predetermined second size increments for a second predetermined cost per data block in response to usage of the communications account increases above a threshold number of data blocks over the predetermined base number of data blocks.

16. The server of claim 15, wherein the first predetermined cost per additional data block is less than a cost per data block normally associated with exceeding the predetermined base number of data blocks during a data plan period for the communications account.

17. The server of claim 16, wherein the operations further comprise adjusting, by the server, the communications account to provide additional data blocks in predetermined second size increments for a second predetermined cost per data block.

18. The server of claim 15, wherein the operations further comprise adjusting, by the server, the communications account to provide additional data blocks in predetermined second size increments for a second predetermined cost per data block in response to usage of the communications account increasing above a threshold number of data blocks over the predetermined base number of data blocks.

19. The server of claim 15, wherein data blocks of the communications account, adjusted by the server, are shared among multiple communication devices.

20. The server of claim 15, wherein the communications account is a post-paid account including a plurality of data plan periods, each data plan period having the predetermined base number of data blocks.

* * * * *